United States Patent
Lydecker et al.

(10) Patent No.: US 6,431,510 B1
(45) Date of Patent: Aug. 13, 2002

(54) HANGING DEVICE AND METHOD OF MAKING SAME

(76) Inventors: Charles Lydecker, deceased, late of Lake Ronkonkoma, NY (US); Baerbel Puritz, heir, 12 Damin Cir., St. James, NY (US) 11780

( * ) Notice: Subject to any disclaimer, the term of this patent is extended or adjusted under 35 U.S.C. 154(b) by 0 days.

(21) Appl. No.: 09/404,271

(22) Filed: Sep. 21, 1999

(51) Int. Cl.⁷ ............................................. A47B 96/06
(52) U.S. Cl. .............................. 248/216.1; 248/217.2; 248/220.22
(58) Field of Search .......................... 248/217.2, 216.1, 248/218.1, 216.4, 217.1, 217.3, 231.9, 467, 493, 497, 224.51, 220.22, 222.13

(56) References Cited

U.S. PATENT DOCUMENTS

| | | | |
|---|---|---|---|
| 3,191,777 A | | 6/1965 | Willits |
| 3,193,225 A | * | 7/1965 | Terlinde ................ 248/220.43 |
| 3,241,799 A | * | 3/1966 | Terlinde ................ 248/220.43 |
| 3,289,991 A | * | 12/1966 | Kalahar ................ 248/220.43 |
| 3,298,651 A | * | 1/1967 | Passer ................... 248/217.2 |
| 3,529,799 A | * | 9/1970 | Schaefer ................ 248/496 |
| 3,556,459 A | * | 1/1971 | Summerville, Jr. ........ 248/497 |
| 3,848,843 A | * | 11/1974 | Levy ................... 248/224.51 |
| 4,083,525 A | * | 4/1978 | Rath .................... 248/496 |
| 4,311,295 A | * | 1/1982 | Jamar, Jr. ............. 248/221.3 |
| 4,422,608 A | * | 12/1983 | Hogg ................... 248/205 A |
| 4,446,642 A | * | 5/1984 | Chap ................... 40/799 |
| 4,458,872 A | * | 7/1984 | Couch .................. 248/497 |
| 4,485,995 A | * | 12/1984 | Hogg ................... 248/218.1 |
| 4,619,430 A | * | 10/1986 | Hogg ................... 248/467 |
| 4,917,337 A | * | 4/1990 | Gridley ................. 248/221.2 |
| 4,923,159 A | * | 5/1990 | Wang et al. ............ 248/205.3 |
| 4,979,713 A | * | 12/1990 | Bell .................... 248/224.3 |
| 5,149,037 A | * | 9/1992 | Smith .................. 248/216.1 |
| 5,269,485 A | * | 12/1993 | Dwinell et al. .......... 248/216.4 |
| 5,605,313 A | * | 2/1997 | Erickson et al. ......... 248/467 |
| 6,095,465 A | * | 8/2000 | Weck et al. ............ 248/205.3 |
| 6,126,126 A | * | 10/2000 | McKiernan, Jr. ........ 248/217.3 |
| D436,841 S | * | 1/2001 | Carpenter .............. D8/373 |
| 6,187,404 B1 | * | 2/2001 | Schumann .............. 428/40.1 |
| 6,349,909 B1 | * | 2/2002 | Zarrow et al. ......... 248/220.41 |

FOREIGN PATENT DOCUMENTS

| | | |
|---|---|---|
| DE | OS 1 404 689 | 12/1961 |
| DE | 3632819 | * 3/1988 |
| EP | 0916294 | * 5/1999 |
| FR | 2606844 | * 11/1986 |

* cited by examiner

*Primary Examiner*—Leslie A. Braun
*Assistant Examiner*—Naschica S. Morrison
(74) *Attorney, Agent, or Firm*—R W Becker & Associates; R W Becker

(57) ABSTRACT

A hanging device for mounting directly on a hollow member, and a method of mounting such device, are provided. The hanging device has a mounting member with a first surface for resting flush against an outer surface of the hollow member. A first piercing component has a first leg that projects from the mounting member substantially perpendicular to the first surface thereof, and a second leg that extends at substantially right angles to the first leg. A free end of the second leg has a sharp tip that is insertable in a self-piercing manner through the hollow member. A second piercing component projects from the mounting member substantially perpendicular to the first surface thereof and essentially parallel to the first leg of the first piercing component. A free end of the second piercing component has a sharp tip that is also insertable in a self-piercing manner through the hollow member. A hanging component is also provided on the mounting member.

6 Claims, 4 Drawing Sheets

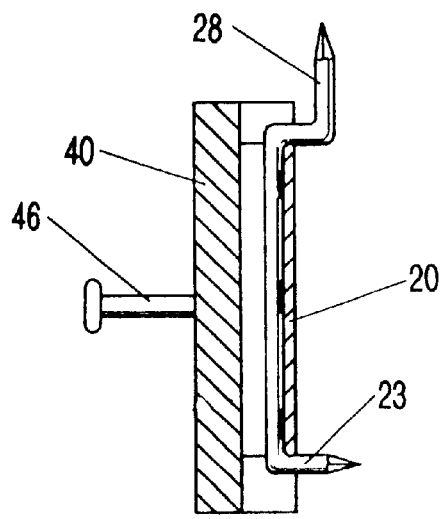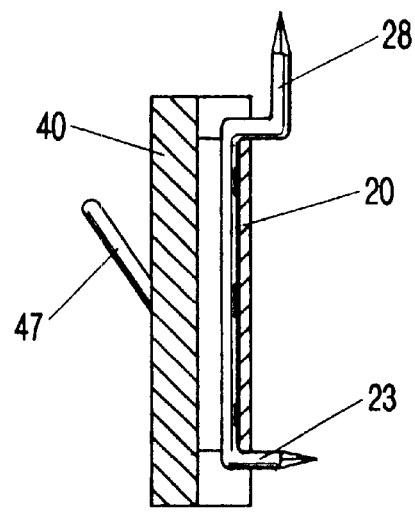
FIG-9　　　　　　　　FIG-10
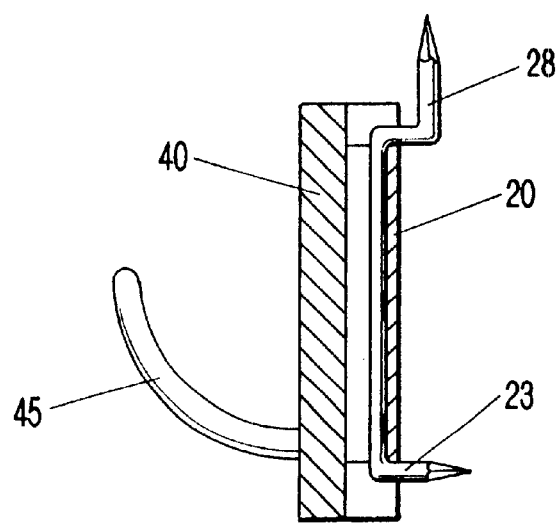
FIG-11

HANGING DEVICE AND METHOD OF MAKING SAME

BACKGROUND OF THE INVENTION

The present invention relates to a hanging device, in other words a device for hanging and supporting objects, including, by way of example only, hangers, clothes, pictures, or any other suitable object that is to be suspended. The hanging device is intended for mounting directly on a hollow member, such as a hollow-core door, drywall, paneling, and the like that has at least one thin sheet or panel. The present invention also relates to a method of mounting such a hanging device on a hollow member.

Devices are known for providing hanging means on surfaces. For example, U.S. Pat. No. 5,149,037, Smith, discloses a wall hanger whereby a curved arm is inserted through an already prepared hole in a wall; this requires preparation of a wall and is not appropriate for use on a thin panel, hollow-core door, or wall. This known wall hanger also has a lower cleat that keeps the hanger from twisting. Other devices for mounting on prepared walls, such as peg boards and wall brackets, are also known. For example, see U.S. Pat. No. 3,191,777, Willits, U.S. Pat. No. 4,917,337, Gridley and German application OS 1 404 689. In addition, U.S. Pat. No. 4,619,430, Hogg, shows a single pointed member that is adapted to penetrate through wall material.

None of the heretoforeknown devices successfully fills the present day need for a device that can be used to hang or support objects where the device is to be mounted on a hollow member, such as a hollow-core door having thin sheets or panels of plywood, masonite, etc.

It is therefore an object of the present invention to provide an improved hanging device that can easily be mounted on a hollow member without having to make holes or otherwise prepare a surface of the hollow member, yet is securely held in a fixed position on the hollow member.

BRIEF DESCRIPTION OF THE DRAWINGS

This object, and other objects and advantages of the present invention, will appear more clearly from the following specification in conjunction with the accompanying schematic drawings, in which;

FIGS. 9–12 are cross-sectional views showing various embodiments of the hanging means of the inventive hanging device.

SUMMARY OF THE INVENTION

The hanging device of the present invention is characterized primarily by a mounting member that has a surface that rests flush against an outer surface of a hollow member; a first piercing means having a first leg that projects from the mounting member substantially perpendicular to the flush surface thereof, and a second leg that extends at substantially right angles to the first leg in a direction away from the mounting member and essentially parallel to the flush surface thereof, wherein a free end of the second leg has a sharp tip that is insertable in a self-piercing manner through a panel of the hollow member; a second piercing means that projects form the mounting members substantially perpendicular to the flush surface thereof and essentially parallel to the first leg of the first piercing means, wherein a free end of the second piercing means has a tip that is insertable in a self-piercing manner through the panel of the hollow member; and hanging means disposed on the mounting member on the side thereof remote from the flush surface thereof.

By means of the unique features of the inventive hanging device, such a hanging device can be mounted on a hollow member such as a door, paneling or wall without any special preparation of the hollow member, requiring at most a hammer to tap the piercing means through the hollow member. No device known to applicant is adapted to be mounted in such a fashion to a hollow member. At the same time due to the unique features of the hanging device, such a device is securely supported on the hollow member.

Further specific features of the present invention will be described in detail subsequently.

DESCRIPTION OF PREFERRED EMBODIMENTS

Figure 6:
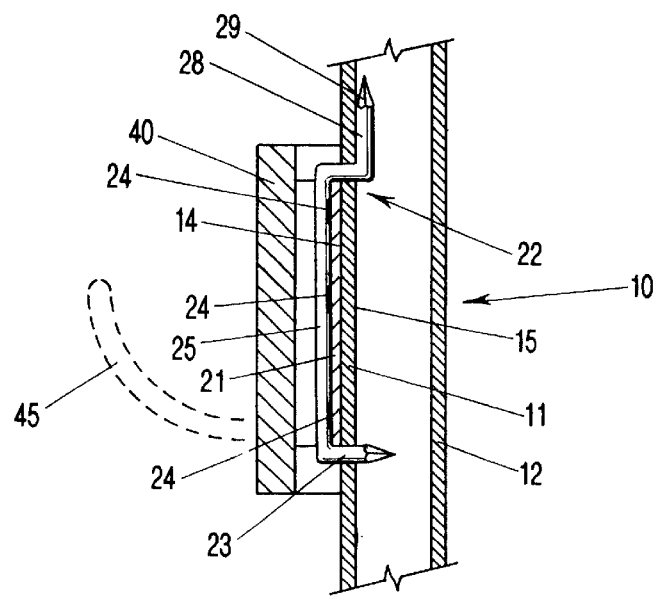
FIG. 6 is a cross-sectional view showing one exemplary embodiment of the inventive hanging device mounted on a hollow member.

Referring now to the drawings in detail, the inventive hanging device comprises a mounting member 20 that is adapted to be mounted on a hollow member. For example, FIG. 6 shows how the mounting member 20 is mounted on the hollow member 10, such as paneling, a wall or a door, in particular a so-called hollow-core door, or any other hollow member. In particular, in the illustrated embodiment the hollow member 10 comprises the thin panels 11 and 12, with the mounting member 20 to be mounted to one of these panels.

Figure 1:
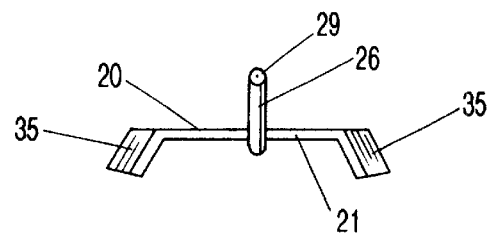
FIG. 1 is a top view of the mounting member of one exemplary embodiment of the inventive device.
Figure 2:
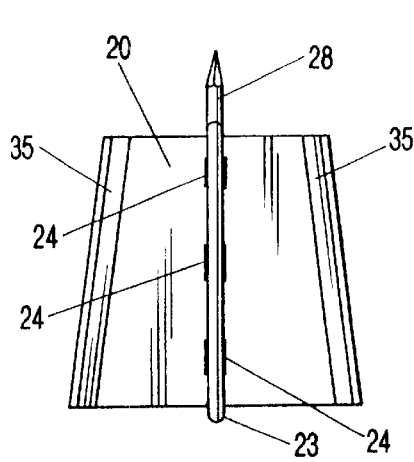
FIG. 2 is a view of the back of the mounting member of FIG. 1.
Figure 3:
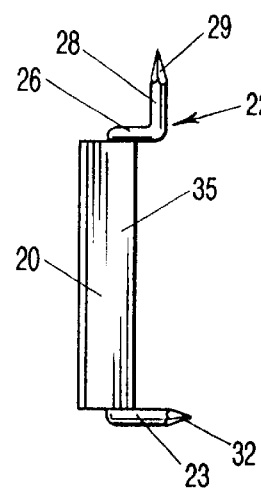
FIG. 3 is a side view of the mounting member of FIG. 1.
Figure 4:
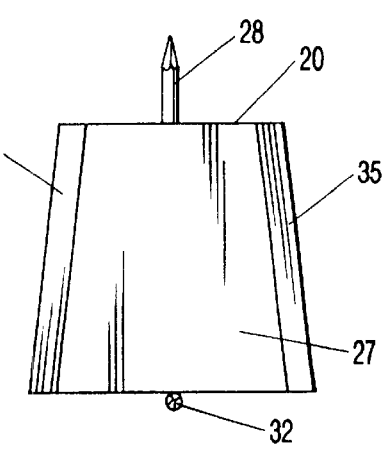
FIG. 4 is a front view of the mounting member of FIG. 1.
Figure 5:
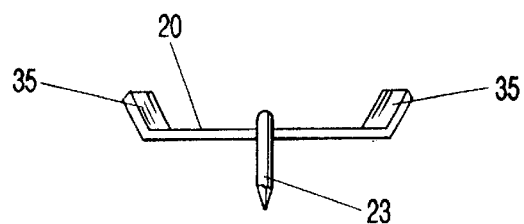
FIG. 5 is a bottom view of the mounting member of FIG. 1.

As can be seen from the drawings, pursuant to one preferred embodiment of the present invention the mounting member 20 comprises a flat section 21 from which project a first piercing means 22 and a second piercing means 23. In the illustrated embodiment, and as can be seen particularly clearly from FIGS. 2 and 8, the piercing means 22, 23 can be formed from a continuous piece of metal that has been appropriately bent and then attached to the flat section 21, for example by being soldered thereto as indicated by the solder points 24. Thus, in this embodiment the piercing means are interconnected by a straight section 25 that rests flushly against the flat section 21, to which it is attached. It is to be understood that the piercing means 22, 23 need not be one continuous piece, and that they can be attached to the flat section 21 in any appropriate manner. Although in the present preferred embodiment the flat section is made of metal, it could also be made of polymeric material, in which case the piercing means 22, 23 could be embedded therein (see FIGS. 13 and 14).

The first piercing means 22 comprises two legs that are disposed at substantially right angles to one another. In particular, the first piercing means 22 comprises a first leg 26 that projects from the flat section 21 substantially perpendicular to the plane thereof and in a direction away from a first surface 27 of the flat section 21. A second leg 28 of the first piercing means 22 extends at substantially right angles to the first leg 26 in a direction away from the flat section 21. The free end 29 of the second leg 28 is embodied as a sharp tip. The second piercing means 23 is in the form of a single straight piece 31 that similarly projects from the flat section 21 substantially perpendicular to the first surface 27 thereof. The free end 32 of the second piercing means 23 is also embodied as a sharp tip.

The mounting member 20 is attached to the hollow member 10 as follows. The mounting member 20 is first aligned with the hollow member 10 such that the second leg 28 of the first piercing means 22 is essentially perpendicular to the outer surface 14 of the thin panel 11 of the hollow member 10. The sharp tip or free end 29 of the second leg 28 of the first piercing means 22 is then caused to be inserted through the thin panel 11, either by manually pushing the sharp tip 29 and second leg through or by tapping the mounting member 20 with a hammer or similar tool until the sharp tip 29 and second leg 28 have been inserted through the thin panel 11. In particular, the first piercing means 22 is inserted through the thin panel 11 to such an extent that the first leg 26 of the piercing means 22 comes to rest against the outer surface 14 of the thin panel 11. The mounting member 20 is then rotated or pivoted until the second piercing means 23 is disposed vertically below the first piercing means 22, with the sharp tip or free end 32 of the second piercing means 23 resting against the outer surface 14 of the thin panel 11. In this position, the second leg 28 of the first piercing means 22 is directed upwardly within the hollow space formed between the two thin panels 11, 12 of the hollow member 10. To complete the mounting process, the sharp tip 32 of the lower piercing means 23 is either pushed through the thin panel 11 or the mounting member 20 is again tapped with a hammer to cause the sharp tip 32 and straight piece 31 of the second piercing means 23 to be inserted through the thin panel 11 until the first surface 27 of the flat section 21 of the mounting member 20 comes to rest against the outer surface 14 of the thin panel. In this position, the second leg 28 of the first piercing means 22 will at least nearly rest against the inner surface 15 of the thin panel 11, whereby the mounting member 20 is securely supported on the hollow member 10, as clearly shown in FIG. 6.

A hanging or suspension means for hangers, clothes, pictures, or any other item that is to be suspended, is provided on a side of the mounting member 20 opposite the first surface 27 of the flat section 21 thereof. In the presently preferred and illustrated embodiment of such a hanging means, this is accomplished by a separate hanging or suspension member 40 that is carried by the mounting member 20. As shown in particular in FIGS. 7 and 8 the hanging member 40 is slid over, and held by, flange means 35 of the mounting member 20. In particular, the flange means 35 are monolithically provided on the flat section 21. In this connection, the flat section 21 is tapered in such a way that the wider base thereof is provided at the lower end of the mounting member 20 where the second piercing means 23 are also provided. The upper, narrower end of the flat section 21 is provided in the vicinity of the first piercing means 22. In view of the tapered configuration of the flat section 21, the identical rectangular flange means 35, which project at an obtuse angle from the second surface 34 of the flat section 21 in a direction away from the piercing means 22 and 23, are closer together in the vicinity of the first piercing means 22 and are spaced further apart in the vicinity of the second piercing means 23. The hanging member 40 is provided with a recess 41 that provides a cooperating means for receiving the flange means 35 of the mounting member 20. In particular, the hanging member 40 is provided with two legs 42, 43 that project in the same direction from a flat connecting element 44. The inner sides of the legs 42, 43 are tapered in such a way that inner surfaces of the legs are closer together at the top of the hanging member 40 than at the bottom thereof. The flange means 35 of the mounting member 20, and the recess 41 of the hanging member 40, cooperate in such a way that when the hanging member 40 is placed over the mounting member 20 as shown in FIGS. 7 and 8, the hanging member 40 will come to rest securely on the mounting member, as shown in FIGS. 6 and 9–12.

Figure 7:
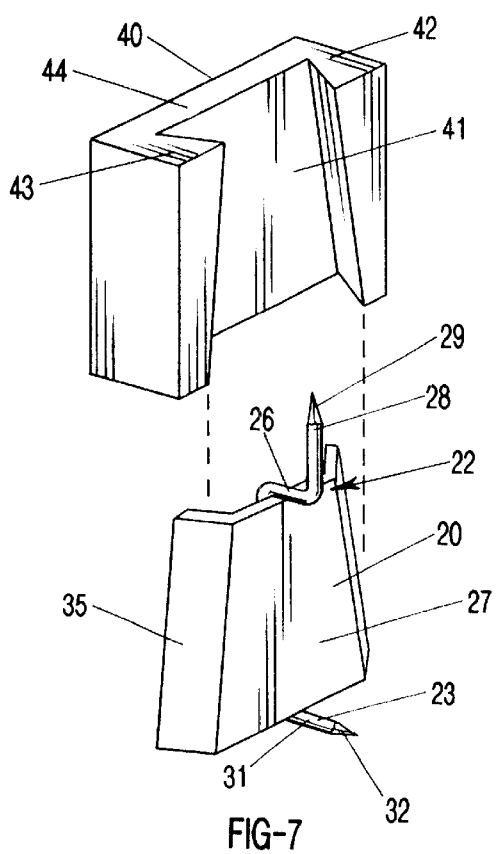
FIGS. 7 and 8 show how the hanging means and the mounting member of the inventive hanging device fit together.
Figure 8:
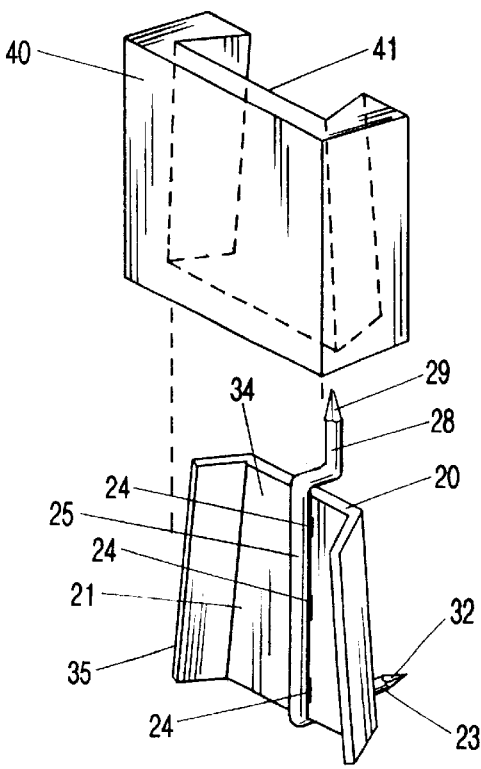
Figure 12:
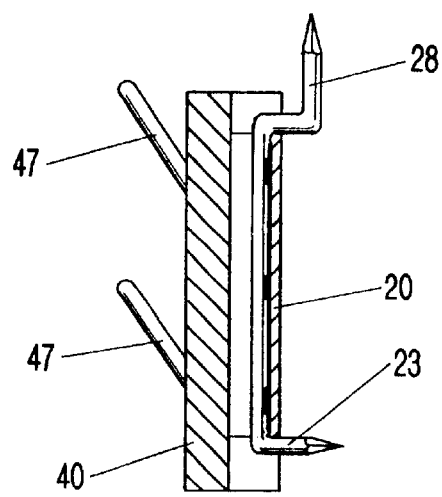

Although not illustrated in FIGS. 7 and 8, the hanging member 40 is provided with a hook 45 (as indicated in dashed lines in FIG. 6 and also shown in FIG. 11), one or more rods or dowels 46 or 47 (as shown in FIGS. 9, 10, and 12), or any other suitable means for hanging or suspending articles thereon.

Figure 13:
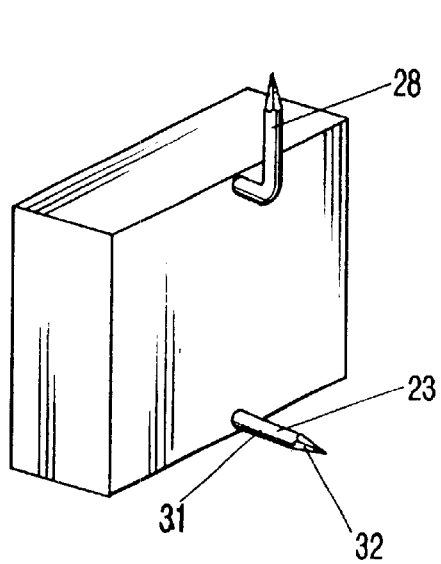
FIGS. 13 and 14 show an integral or one-piece hanging device of the present invention.
Figure 14:
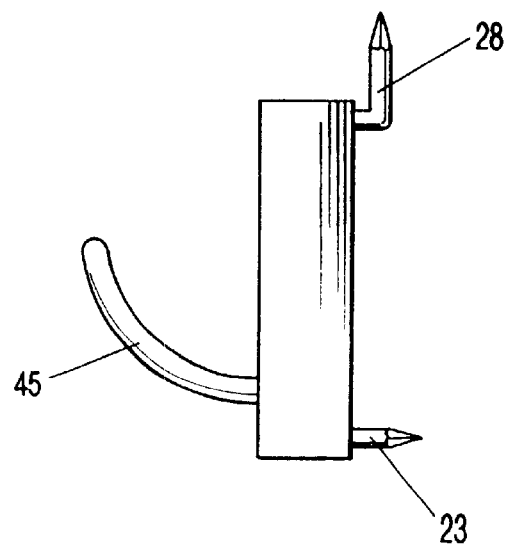

Although the hanging or suspension member has been described as being a separate component 40, it is also possible for the hanging means to be monolithically or integrally formed on the mounting member 20, as shown in FIGS. 13 and 14. The hanging means could either be molded onto or into the mounting member, or the mounting member and hanging means could be a monolithic component.

It is to be understood that the hanging or suspension member can have any desired shape. For example, where the hanging or suspension member is a separate component 40, not only can the recess 41 have a shape that is compatible with the flange means 35 or any other cooperating attachment means of the mounting member 20, the remainder of the component 40 can also have any desired shape in order to provide any number of pleasing shapes that might be desired by a customer. Similarly, where the hanging or suspension member is a single or integral piece with the mounting member, the shape thereof need not be in the block shape shown by way of example only in FIGS. 13 and 14, but could again be of any desired shape.

It is also to be understood that although the leg 26 of the first piercing means 22 has been shown to have a particular distance between the straight section 25 and the second leg 28, the length of the first leg 26 could be varied to conform to varying thicknesses of paneling, doors, walls, etc. for which the inventive device is to be used.

Although in the illustrated embodiments of the mounting member 20, the piercing means 22 and 23 are shown as extending over the upper and lower edges of the flat section 21, it would also be possible for the piercing means 22 and 23, and in particular the leg 26 and the straight piece 31 thereof, to extend through holes in the flat section 21, so that from the side the mounting member 20 would have an appearance similar to that of the embodiment illustrated in FIG. 14. In such a case, the straight interconnecting section 25 that is disposed flush against the side of the flat section 21 would not extend over the entire length of the flat section 21.

The present invention is, of course, in no way restricted to the specific disclosure of the specification and drawings, but also encompasses any modifications within the scope of the appended claims

What is claimed is:

1. A hanging device for mounting directly on a hollow member having at least one thin panel, said device comprising:
   a mounting member having a first surface for resting flush against an outer surface of said at least one panel of the hollow member;
   a first piercing means having a first leg projecting from said mounting member substantially perpendicular to said first surface thereof, and a second leg that extends at substantially right angles to said first leg in a direction away from said mounting member and essentially parallel to said first surface thereof, wherein a free end of said second leg has a sharp tip that is insertable in a self-piercing manner through said at least one panel of said hollow member;

a second piercing means projecting from said mounting member substantially perpendicular to said first surface thereof and essentially parallel to said first leg of said first piercing means, wherein a free end of said second piercing means has a sharp tip that is insertable in a self-piercing manner through said at least one panel of said hollow member, and wherein said second piercing means and said first leg of said first piercing means are interconnected by a straight section that is disposed flushly against a side of a flat section of said mounting member that is remote from said first surface of said mounting member; and a separate hanging member for hanging and supporting objects, disposed on said mounting member on a side thereof remote from said first surface thereof, wherein said mounting member is provided with attachment means for cooperating and mating with attachment means of said hanging member, wherein said attachment means of said mounting member comprises flanges that project away from said side of said flat section of said mounting member that is remote from said first surface thereof, wherein said mating attachment means of said hanging member comprises a recess provided therein for receiving said flanges, wherein said flat section has sides that taper toward one another in a direction toward said first piercing means, and wherein said flanges join said flat section at said tapered sides thereof.

2. A hanging device according to claim 1, wherein said flanges project from said flat section at an obtuse angle.

3. A hanging device according to claim 1, wherein said hanging member comprises a flat element from which project two legs to form said recess, and wherein facing sides of said legs extend at an angle to one another to conform to the taper of said mounting member.

4. A hanging device according to claim 1, wherein at least one hook, rod, or dowel is disposed on a side of said hanging member remote from said attachment means thereof.

5. A hanging device according to claim 1, wherein said second piercing means and said first leg of said first piercing means extend substantially perpendicular from said straight section over opposite edges of said flat section that respectively extend between said tapered sides thereof.

6. A method of mounting the hanging device of claim 1 on the hollow member, including the steps of:

causing said sharp tip of said second leg of said first piercing means of said mounting member to be inserted through said at least one panel of said hollow member until said first leg of said first piercing means butts against said outer surface of said at least one panel;

rotating said mounting member until said second piercing means is vertically below said first piercing means; and causing said sharp tip of said second piercing means to be inserted through said at least one panel of said hollow member until said first surface of said mounting member rests flushly against said outer surface of said at least one panel, whereby an entire length of said second leg of said first piercing means will at least nearly rest against an inner surface of said at least one panel of said hollow member.

\* \* \* \* \*